Jan. 20, 1970  H. LESCURE  3,490,357
ELECTRIC GRILL FOR FOODS
Filed Aug. 26, 1968  4 Sheets-Sheet 1
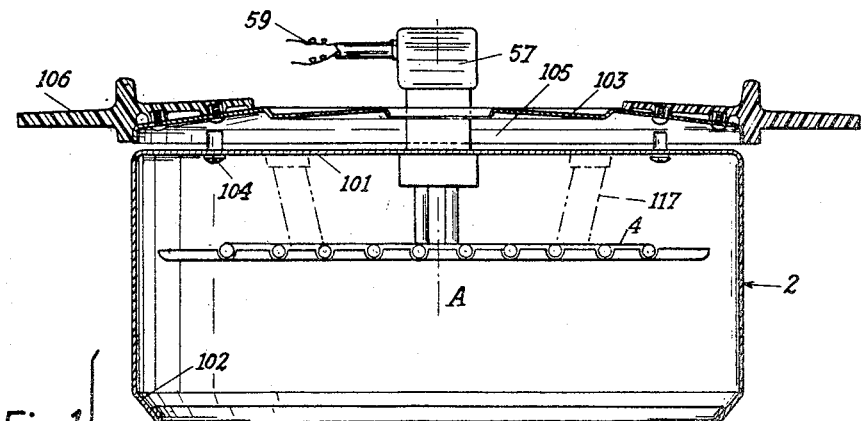
Fig. 1
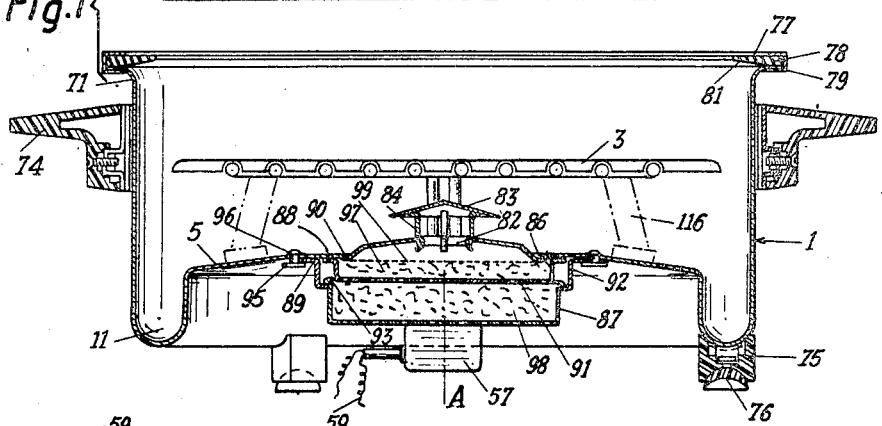
Fig. 2
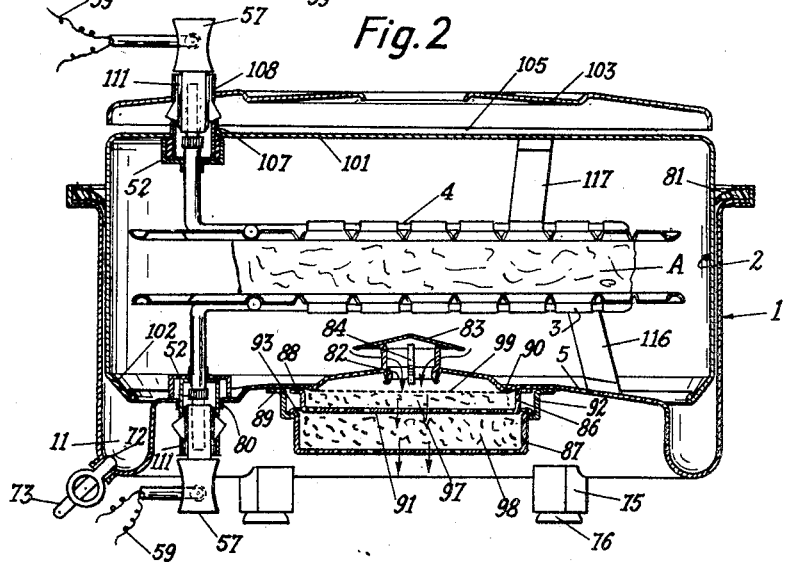
INVENTOR
HENRI LESCURE
By Young & Thompson
ATTYS.

Jan. 20, 1970  H. LESCURE  3,490,357
ELECTRIC GRILL FOR FOODS
Filed Aug. 26, 1968  4 Sheets-Sheet 2
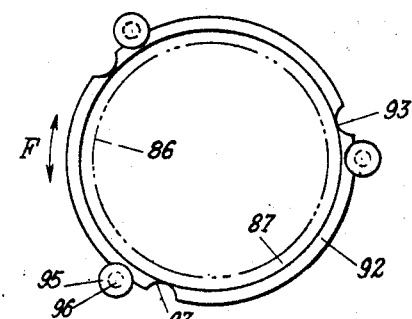
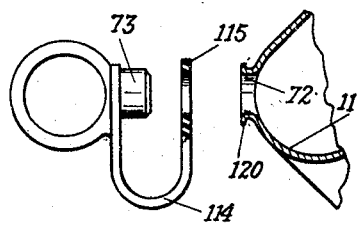
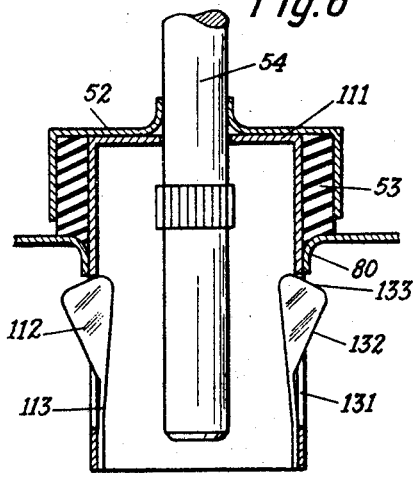
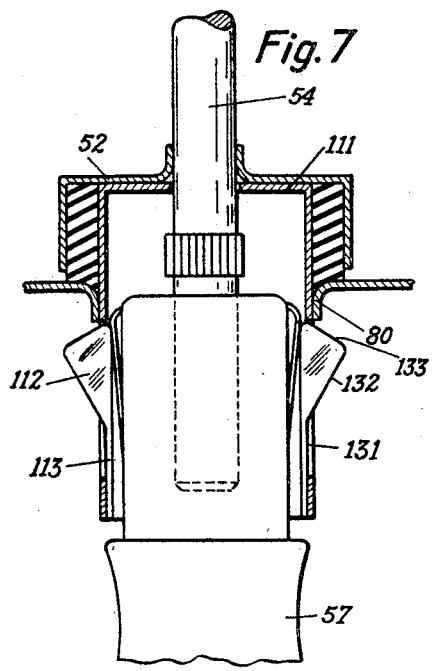
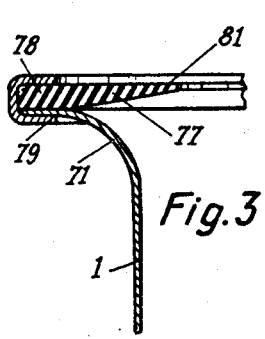
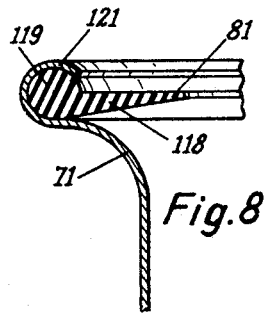
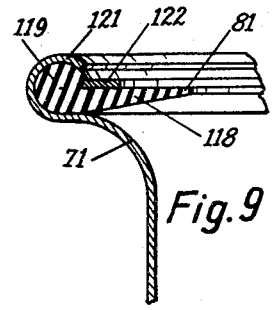
INVENTOR
HENRI LESCURE
By Young + Thompson
ATTYS.

Jan. 20, 1970  H. LESCURE  3,490,357
ELECTRIC GRILL FOR FOODS
Filed Aug. 26, 1968  4 Sheets-Sheet 3

INVENTOR
HENRI LESCURE
By Young & Thompson
ATTYS.

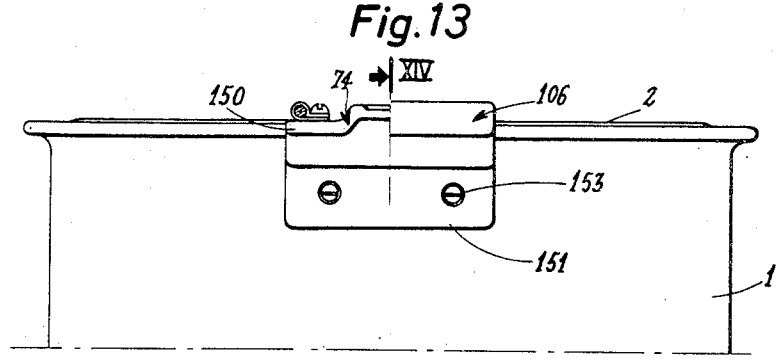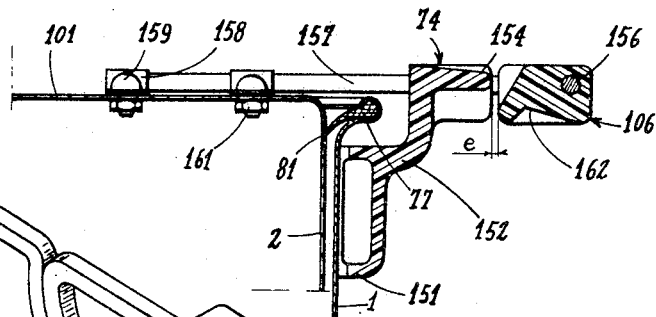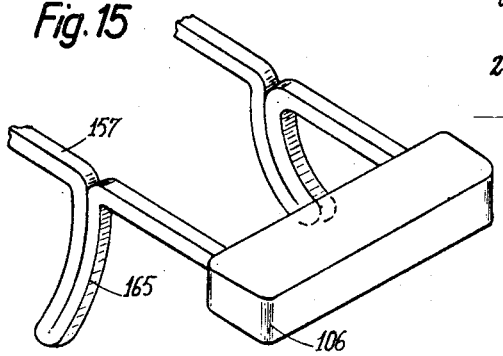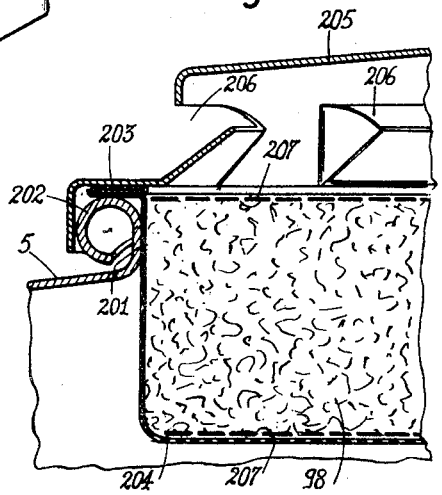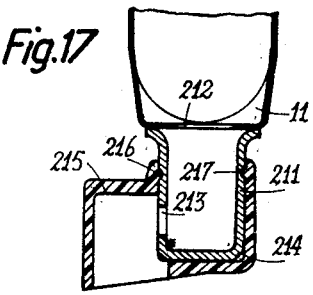

United States Patent Office 3,490,357
Patented Jan. 20, 1970

3,490,357
ELECTRIC GRILL FOR FOODS
Henri Lescure, Cote d'Or, Selongey, France
Filed Aug. 26, 1968, Ser. No. 755,212
Claims priority, application France, Sept. 12, 1967,
120,665; Jan. 10, 1968, 135,445
Int. Cl. A47j 37/04
U.S. Cl. 99—390    21 Claims

ABSTRACT OF THE DISCLOSURE

An electric grill for various foods such as meat, fish, bread and the like and comprising two shells mounted in interengaged relation and each containing an electric resistance heater element of the shielded type with spaced arms, one of said shells being fitted in the vicinity of its opening with an elastically deformable annular seal which has a free portion directed towards the surface of the other shell with is adapted to come into contact with said other shell in the interengaged position. The grill is characterized in that the annular seal has a flexible lip which is deformed by bending when the two shells are interengaged. Preferentially the lipped flexible seal is mounted on the lower shell, the free edge of said seal being directed towards the interior of said shell into which the upper shell is adapted to penetrate.

---

There was described in my copending application Ser. 656,371, filed July 27, 1967 an electric grill for various foods such as meat, fish, bread and the like and comprising two shells which can be mounted one over the other, each shell being adapted to contain an electric heating resistor of the shielded type with spaced arms.

According to a preferred embodiment of said application, the two shells are mounted in interengaged relation, one of the shells being fitted with clamping members which are adapted to cooperate with the other shell for the purpose of adjusting the relative positions of said shells and consequently of the heating resistors which are carried by these latter.

In the embodiment of the kind above referred-to the clamping members are adjustable. When they are in the clamped position, the shells are locked in position as a result of frictional interengagement. If said shells are released, they are capable of sliding freely with respect to each other. A structure of this type proves wholly satisfactory but is relatively costly to produce. One of the objects of the present invention is to permit a reduction in cost price of the apparatus while offering the same facilities of positional adjustment of the two shells and of disengagement of the shells after cooking.

A further object of the invention is to remove any danger of burns to which users are at present exposed during operations of sliding of the two shells.

According to said application, one of the shells is fitted with a deodorizing filter. One of the objects of the present invention is to increase the service life and efficiency of said deodorizing filter.

Again in accordance with said application, the electric plug-connectors which are adapted to carry the resistance heater elements are fitted with locking members which are actuated by the corresponding socket-connectors. Another object of this invention is to prevent any accidental disengagement of the plug-connectors at the time of insertion of the socket-connectors referred-to.

In the present invention, the grill which comprises two shells mounted in interengaged relation and each containing an electric resistance heater element of the shielded type with spaced arms, one of said shells being fitted in the vicinity of its opening with an elastically deformable annular seal which has a free portion directed towards the surface of the other shell and which is adapted to come into contact with said other shell in the interengaged position is characterized in that the annular seal has a flexible lip which is deformed by bending when the two shells are interengaged.

The friction which is developed by the flexible lip of the seal by reason of its deformation makes it possible to eliminate any member for regulating the clamping force. The relative position of the shells can thus be adjusted freely by mutual sliding with friction.

In a preferred embodiment, the flexible lipped seal is mounted on the lower shell, the free edge of said seal being directed towards the interior of said shell into which the upper shell is adapted to penetrate. This mode of assembly is particularly simple and effective.

In an advantageous embodiment, there is mounted above the upper shell a shield which forms a free space between said shield and the top face of said shell, thereby protecting the user from burns resulting from accidental contact with this part of the shell. Preferably, the shield is fitted with handles for the purpose of handling the upper shell whilst the lower shell is provided with suction cups for the purpose of fixing it on a support. In consequence, operations entailing engagement and disengagement of the shells are greatly facilitated.

A further improvement in the present invention which is combined with the arrangement of a flexible lipped seal is primarily intended to facilitate the disengagement of the two shells prior to and after each cooking operation in the event that said seal were to set up a substantial resistance in opposition to the adhesive action of the suction cups of the lower shell which might in such a case prove insufficient. This can be the case in particular when the seal employed is of the strip type and must therefore be subjected to a reversal of its direction of curvature when the upper shell is removed from the lower shell after it has been engaged therein to the full extent.

In accordance with this improvement which is applicable to the case in which each shell is fitted with a pair of outwardly-projecting handles, the handles of the upper shell come into position externally with respect to the handles of the lower shell when said shells are moved into a relative position such that said handles are placed opposite to each other and substantially at the same level.

The operator can thus use some fingers to press on the handles of one of the shells and the other fingers to press on the handles of the other shell in order that the shells may be thrust in opposite directions and thus disengaged.

In a preferred arrangement, at least one of the pairs of handles which form part of each shell and especially the pair of the lower shell has a stepped profile such that, in the position of maximum engagement of the upper shell in the lower shell, the top faces of the handles of both shells are substantially located at the same level.

It is then an easy matter for the operator to disengage the upper shell by bearing on the handle of the lower shell.

According to another advantageous feature of the invention, the lower shell has an inwardly concave base surrounded by a peripheral annular trough for collecting the cooking juices, a deodorizing filter which is adapted to communicate on the one hand with the interior of the shell and on the other hand with the outer air being fixed within the concave base considered.

In accordance with a further improvement, the plug-connector of each shell comprises at least one retractable retaining member which, in the rest position, brakes the free sliding motion of said plug-connector within the bore of the shell in which it is fitted, means being additionally provided for bringing said retaining member into the locked position of the plug-connector at the time of insertion of the socket-connector.

In an advantageous arrangement, the retaining member is constituted by a key which is mounted elastically on the plug-connector.

In the accompanying drawings, which are given by way of example and not in any sense by way of limitation:

FIG. 1 is an axial sectional view of the grill, the lower shell and upper shell being shown in the separated position, whereas the electric resistors or heater elements are shown in the connected position;

FIG. 2 is an axial sectional view taken on a plane at right angles to the preceding and showing the grill in the service position;

FIG. 3 is an enlarged sectional view of the seal in the free position;

FIG. 4 is a diagrammatic plan view on the same scale as FIGS. 1 and 2 showing the bayonet-type connection of the deodorizing filter;

FIG. 5 is a detail sectional view of a portion of the trough of the lower shell together with its plug;

FIG. 6 is an enlarged transverse sectional view of a plug-connector which has been placed in position inside the bore of a shell, the socket-connector having been removed;

FIG. 7 is the corresponding sectional view of the plug-connector, the socket-connector being shown in the engaged position;

FIGS. 8 and 9 are sectional views which are similar to FIG. 3 and show two alternative forms of seal;

FIG. 13 is a partial side view, the shell being fully interengaged and one of the handles having been broken away;

FIG. 14 is a half-sectional view taken along line XIV—XIV of FIG. 13;

FIG. 15 is a perspective diagram of a handle of the upper shell according to an alternative form of construction;

FIGS. 16 and 17 are partial sectional views relating to alternative forms of construction of certain parts of the grill.

Figure 10:
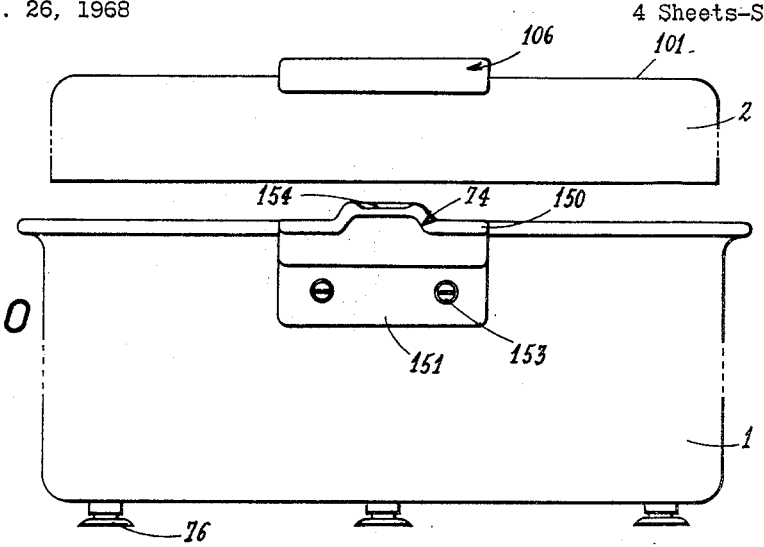
FIG. 10 is the side view of the grill in an improved form of construction, the shells being shown in the separated position.

Referring now to FIGS. 1 and 2 of the accompanying drawings, it is apparent that, in the particular embodiment which is contemplated, the grill comprises a lower shell 1 and an upper shell 2 which each contain respectively an electric heating resistor 3 or 4 of the shielded type with spaced arms which is detachably mounted in the shell, each shell being constituted by a single casing.

Ae described in my copending application above referred-to, the shells 1 and 2 have a cylindrical external surface, the internal diameter of the shell 1 being slightly greater than the external diameter of the shell 2 in order to permit free sliding engagement of the upper shell within the lower shell by displacement along their common axis A—A.

The shell 1 has an inwardly-recessed or concave base 5 around which is formed an annular trough 11 having an outlet 72 which is closed by a detachable plug 73, as shown in FIG. 5.

The plug 73 is preferably formed of flexible material such as silicone rubber which affords resistance both to heat and to fats. A link 114 is integral with the plug 73 and terminates in a flexible ring 115 which is intended to be detachably fixed in the groove of an annular flange 120 which surrounds the outlet 72.

The shell 1 is provided with two handles 74 of insulating material and is supported on feet 75 which are also formed of insulating material and underneath which are mounted flexible and adherent suction cups 76.

As shown in FIG. 3, the top rim 71 of the lower shell 1 is flared and fitted with a flexible annular seal 77 which is formed, for example, of silicone rubber. The seal 77 is adapted to project inwards into the shell 1 and is clamped around its outer periphery by a U-section ring 79 in which the shell rim 71 is also engaged.

The seal 77 forms towards the interior a flexible lip 81 having an internal diameter which is slightly smaller than the external diameter of the shell 2.

The concave base 5 of the shell 1 is provided at the center with an opening 82 above which is mounted a protective cap 83, said cap being detachably fastened by means of flexible lugs 84.

The grill is equipped with a deodorizing filter which is housed beneath the concave base 5 of the shell 1 and is fitted in position in the central portion of said base.

Said filter comprises two superposed trays 86 and 87 with perforated bases. The upper tray 86 contains a product 97 which is intended to absorb fat-laden vapors (such as calcined clay having a small particle size) and the lower tray 87 contains an odor-absorbent product 98 such as activated charcoal.

The upper tray 86 is covered with a cloth 99 of smoke-resistant synthetic material which retains the product 97.

The deodorizing filter constitutes a cartridge filter which is detachably mounted underneath the base 5 by means of a bayonet-type fastening. To this end, the tray assembly 86, 87 is provided with a surrounding annular flange 92, the free edge of which is provided with notches 93 (as shown in FIG. 4) for the insertion of button-heads 95 of studs 96 which are secured beneath the base 5.

After the notches 93 have been passed around the studs 96, the annular flange 92 is rotated in the direction of the arrow F as shown in FIG. 4, thereby locking the filter assembly. In this position, an annular ridge 90 of the base 5 is resiliently applied against the cloth 99.

In addition, the shell 2 has a top wall 101 and an inwardly-narrowed bottom edge 102.

A circular shield 103 is secured by means of studs 104 to the top wall 101 and located at a distance from this latter so as to form a free space 105.

Handles 106 of insulating material are fixed on the shield 103 for the purpose of handling the shell 2.

Finally, the top wall 101 and the shield 103 are provided with oppositely-facing bores 107 and 108 respectively for the purpose of mounting the resistance-type heater element 4.

Each shell 1 and 2 is equipped with an electric resistance heater element 3, 4 respectively, the structural design of which is similar to that of the main patent. Said heater elements are provided with support legs 116, 117 and elbowed terminal arms on which are mounted detachable plug-connectors 111. The plug-connector 111 of the shell 1 passes through a bore 80 of the base 5 and the plug-connector 111 of the shell 2 is adapted to pass both through the bore 107 of the top wall 101 and through the bore 108 of the shield 103.

The plug-connectors 111 which are of identical structure each contain two connector-pins 54, thus permitting the engagement of socket-connectors 57 which are also detachable, of identical design, and supplied with current by means of lead-wires 59.

As shown in FIG. 6, each plug-connector 111 is protected by a shroud 52 with interposition of a seal 53 and provided with retaining members each constituted by a key 112 which is mounted elastically by means of a blade-spring 113. The keys 112 which, in the rest position, project to a partial extent through slots 131 of the plug-connector 111 are provided externally with two ramps 132, 133 having unequal angles of slope. When the plug-connector 111 is in position, the ramp 132 comes substantially into contact with the edge of the bore 80 or 107 of the corresponding shell.

By virtue of this arrangement, at the time of engagement of the socket-connectors 57 and as soon as these latter are inserted in the shrouded plug-connectors 111, the keys 112 are thrust outwards and, as shown in FIG. 7, prevent the connectors 111 from passing out of the bores under the action of the thrust exerted by said socket-connectors on the connector-pins 54.

The utilization of the grill as thus improved is as follows:

The shells 1 and 2 being separated from each other, the plug-connectors 111 are fitted in position inside each shell. Penetration of said connectors into the bores 80 or 107 is permitted by the radial movement of withdrawal of the keys 112. This movement is facilitated by the small angle of slope of the ramps 132. When the plug-connectors 111 are in position, the keys 112 return to their initial rest position and the ramps 133 which have a greater angle of slope are applied against the edges of the bores as shown in FIG. 6, thus constituting a resilient brake which prevents any accidental displacement of the plug-connectors 111 while nevertheless permitting their subsequent detachment.

When a food product A to be grilled has been placed on the heater element 3, the shell 2 is engaged inside the shell 1 until the heater element 4 comes into contact with the food product A. Introduction of the shell is facilitated by the curvature and rolling of the edge 102.

During this movement, the lip 81 of the seal 77 is turned downwards and ensures leak-tightness by preventing the gases which are given off during cooking from passing between the walls of the two shells 1 and 2. The slight pressure of the gases tends to apply the lip 81 against the wall of the shell 2 and thus to enhance the tightness of the seal.

Leak-tightness is thus ensured by making use of a single casing for the upper shell and without having recourse to a clamping device.

Grilled steaks are cooked by applying the heater element 4 in contact with the food A. The pressure exerted on the food product by the upper shell 2 produces a favorable result.

In the case of a roast, it is an advantage to allow a space to remain between the heater element 4 and the food product A. To this end, use is made of removable grids which are placed between said food product and the heater elements.

The temperature of the shield 103 which is located at a distance from the top wall 101 remains of a low order, thus forestalling the danger of burns. The handles 106 also remain at a low temperature inasmuch as they are attached to the shield 103. Furthermore, it is possible by virtue of the design function of the shield to provide this latter in the form of a decorative fitting.

Insertion of the socket-connectors 57 within the shrouded plug-connectors 111 is carried out without any attendant danger of driving-out these latter as has been explained in the foregoing.

The keys are maintained outwardly-projecting from the plug-connectors 111 as long as the socket-connectors 57 are in position. Said plug-connectors are thus locked within the bores 80, which is an important safety feature.

The gases which are given off as a result of cooking penetrate through the opening 82 into the deodorizing filter and are discharged through the perforations formed in the base of the tray 87 after having been freed from the fat-laden smoke within the tray 86 and from odors within the tray 87. The smoke is caused to pass through the entire filter unit by virtue of the elastic deformation of the cloth 99 under the action of the pressure applied on this latter by the annular ridge 90.

Inasmuch as the filter is placed outside and beneath the grill, it is not heated to a high temperature, which is favourable to its length of service. Moreover, by virtue of the position adopted, the filter can be readily accommodated without increasing the overall dimensions of the grill.

Replacement of the filter is facilitated by the bayonet fastening which is provided.

By means of the inwardly-recessed base 5 and the protective cap 83, the cooking juices are permitted to flow into the annular troughs 11 and can readily be withdrawn by means of the plug 73. The shrouds 52 of the plug-connectors 111 together with their seals 53 prevent the juice from penetrating into the electrical connections.

In order to detach the upper shell 2, it is only necessary to lift it by the handles 106 inasmuch as the suction cups 76 provided at the extremities of the insulating feet 75 maintain the lower shell 1 fixed on its support. The resistance opposed by the lip 81 of the seal 77 which is in frictional contact with the shell 2 is thus readily overcome.

The invention is obviously not limited to the example hereinbefore described and alternative forms of execution can accordingly be contemplated.

In one alternative form shown in FIG. 8, the seal 118 is provided externally with an annular bead 119 which is clamped within a rolled-down edge 121 of the shell 1. In another alternative form shown in FIG. 9, a flexible ring 122 is mounted on the seal 118 in order to strengthen the fastening and enhance the stiffness of the lip 81.

Referring to FIGS. 10 to 14, there will now be described one form of construction of the handles of the shells 1 and 2 which is primarily intended to be employed in conjunction with shells which are joined together by means of a flexible lipped seal such as the seal 77 hereinbefore described. Each handle 74 of the shell 1 is fabricated from molded material and comprises a hollow base 151 which is secured to the cylindrical wall of said shell by means of two screws 153. The base 151 has an upward extension in the form of an elbowed wall 152 provided with a flange 150. A central raised portion 154 is formed on the top face of said flange and, as will become apparent hereinafter, is intended to serve as a support for the operator's thumb.

The shell 2 is provided with a pair of diametrically opposite manipulating handles 106 formed of molded material. Said handles are secured to the top wall 101 of the shell 2 or, if necessary, to the shield which is placed above said top wall, by means of a metallic U-shaped stirrup, the central arm 156 of which is embedded in the molded material of the handle 106.

Each lateral arm 157 of the stirrup is slidably mounted in two fastening clips 158 which are in turn secured to the top wall 101 (or if necessary to the shield) by means of screws 159 which are engaged in nuts 161.

Each handle 106 is provided in its underface with a shaped recess 162 in order to provide a support for the operator's fingers other than the thumb.

It should be ensured that, in the service position, the shells 1 and 2 are placed in a relative position such that the handles 74 and 106 are substantially centered with respect to each other, or, in other words, are located in the same plane of symmetry which passes through the axis of the shells.

Figure 11:
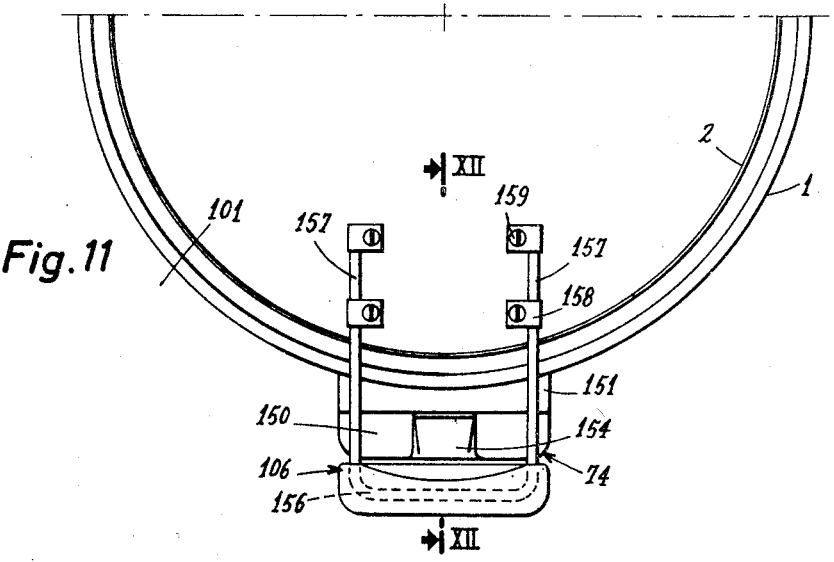
FIG. 11 is a partial plan view of the shells.
Figure 12:
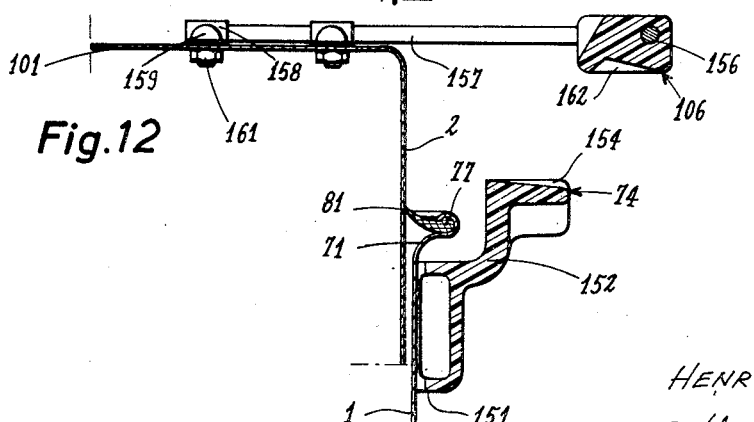
FIG. 12 is an axial half-sectional view of the handles taken along line XII—XII of FIG. 11, the shells being partly engaged.

The arms 157 of the stirrups are locked by the nuts 161 in a position such that each handle 106 extends beyond the handle 74 relative to the edge of the shell 1, as shown in FIGS. 11 and 14. Preferably, inasmuch as the handles 74 and 106 are disposed substantially at the same level and in opposite relation, the clearance e between the oppositely-facing edges of the two handles is small and just sufficient to allow the handle 106 to pass.

Furthermore, each handle 74 is preferably constructed so that, when the shell 2 is located in the vicinity of the position of maximum insertion in the shell 1, the top faces of the raised portion 154 and of the handle 106 come substantially to the same level, as shown in FIG. 14.

The distance between the stirrup arms 157 is such that in the last position referred-to, the handle 74 is completely surrounded by the handle 106 and its arms 157.

The grill is employed as follows:

The shell 2 being initially engaged to the maximum extent within the shell 1, the lip 81 of the seal 77 is turned downwards towards the base of said shell and the top faces of the handles 74 and 106 are located substantially at the same level.

In order to separate the shells, the resistance which is necessary to turn back the lip in the opposite direction must accordingly be overcome.

The operator grips each handle 106 and applies pressure with his thumbs on the raised portions 154 of the adjacent handle 74 while placing his other fingers within the recess 162 of the handle 106. As a result of the opposing efforts exerted by the thumbs and the other fingers, a lever action can thus be applied manually by the operator so as to lift the handles 106 and cause the reversal of the lip 81. The lever action referred-to additionally results in the application of a downward force on the lower handle 74 which serves to apply the shell 1 against the bearing surface and to ensure the adhesion of the suction cups 76. From this moment onwards, the separation of the shells 1 and 2 is carried out without any substantial effort whilst the suction cups 76 of the shell 1 effectively prevent any lifting movement of this latter.

Separation of the two shells is thus facilitated to a considerable extent.

The reverse movement is carried out without any difficulty by applying pressure on the handles 106.

It will be noted that the means provided are especially effective when the apparatus is completely closed and the upper shell 2 is fully engaged within the lower shell 1.

This case arises when the user is about to put the grill into service; at this moment, the apparatus is cold and the lip 81 of the seal is less flexible, thus making this grill more difficult to open.

In all other cases and especially during cooking of a thick food product, the apparatus is in the hot state and the seal is readily reversed simply by applying a tractive effort on the upper handles without any need to bear on the lower handles.

In a first alternative embodiment, in the position of maximum interengagement of the shells, the top faces of the handles are not located at the same level. In particular, the handle face of the lower shell comes into position above the face of the other handle at a distance from this latter which is compatible with the shell-separating operation described in the foregoing.

This particular arrangement is obtained by means of a higher stepped positioning of the handle of the lower shell or by means of a lower stepped positioning of the arms which secured the handle of the upper shell or by means of a combination of the two stepped positions.

According to another alternative embodiment, the shells are provided with a guiding device for the purpose of facilitating the superposition of the handles and the centering of the latter. For example, as shown in FIG. 15, the stirrup-arms 157 can be adapted to form downwardly-directed elbows 165 which are additionally curved in such a manner as to be directed away from each other. In this manner, the elbows 165 are placed on each side on each handle 74 when the shell 2 is in the top position thereof and, if necessary, may thus provide progressive centering of the handles as the shell 2 is pressed down.

It accordingly follows that the deodorizing filter can be mounted in the manner shown in FIG. 16. Thus, the base 5 of the shell 1 is provided with a central opening 201 surrounded by a rolled-down edge 202 which serves as a support for the flange 203 of the detachable cartridge-filter 204. Said filter is fixed in position by means of a removable cap 205 which is positioned within the interior of the shell 1 after removal of the heater element 3. The cap 205 is locked by rotating the rolled-down edge 202 on a helical ramp and is provided with slots 206 for the circulation of air. In this version, the filter only comprises an active odor-absorbent material 98 which is maintained between two sheets 207 of glass fabric having a very fine mesh.

In another alternative construction which is shown in FIG. 17, the cock which provides an outlet for the juice is constituted by a cup 211 which is welded beneath the annular trough 11 at the lowest point of this latter and opposite to an opening 212. The cup 211 has a second outlet 213 for the juice and is fitted with a detachable tubular member 214 of plastic material which serves as a cock and is provided with a discharge spout 215. The member 214 is rotatably mounted on the cup 211 by means of an annular boss 216 and groove 217. When the member 214 is in the position shown in FIG. 17, the juice is permitted to flow through the spout 215. If the member 214 is rotated, the opening 213 is closed and the juice is retained.

I claim:

1. An electric grill for various foods such as meat, fish, bread and the like and comprising two shells mounted in interengaged relation and each containing an electric resistance heater element of the shielded type with spaced arms, one of said shells being fitted in the vicinity of its opening with an elastically deformable annular seal which has a free portion directed towards the surface of the other shell and which is adapted to come into contact with said other shell in the interengaged position, characterized in that the annular seal has a flexible lip which is deformed by bending when the two shells are interengaged.

2. A grill in accordance with claim 1, characterized in that the lipped flexible seal in mounted on the lower shell, the free edge of said seal being directed towards the interior of said shell into which the upper shell is adapted to penetrate.

3. A grill in accordance with claim 1, each shell of which is provided with two diametrically opposite handles and characterized in that the handles of the upper shell are adapted to come into position externally of the handles of the lower shell when the shells are moved to a relative position such that said handles are placed in oppositely-facing relation and substantially at the same level.

4. A grill in accordance with claim 3, characterized in that at least one of the pairs of handles attached to each shell and especially the pair of the lower shell is provided with a stepped profile.

5. A grill in accordance with claim 3, characterized in that, in the position corresponding substantially to the maximum engagement of the upper shell in the lower shell, the upper faces of the handles of the two shells are located substantially at the same level.

6. A grill in accordance with claim 3, characterized in that the handles of the lower shell are each provided with a central raised portion on which the operator's thumb is intended to bear.

7. A grill in accordance with claim 3, characterized in that the underface of each handle of the upper shell is provided with a recess in which the operator's fingers are intended to bear.

8. A grill in accordance with claim 3, characterized in that the handles of the upper shell are fitted with projecting guide members which are adapted to cooperate with the handles of the lower shell.

9. An electric grill for various foods such as meat, fish, bread and the like and comprising two shells mounted in interengaged relation and each containing an electric resistance heater element of the shielded type with spaced arms, one of the said shells being fitted in the vicinity of it opening with an elastically deformable annular seal which has a free portion directed towards the surface of the other shell and which is adapted to come into contact with said other shell in the interengaged position, characterized in that the base of the lower shell is fitted with a deodorizing filter which is adapted to communicate with the interior of said shell.

10. A grill in accordance with claim 9, characterized in that the deodorizing filter comprises a detachable cartridge-filter mounted in an opening of the base of the lower shell, said cartridge-filter being maintained in position by means of a detachable cap which projects into the shell and is mounted on a flange of the opening.

11. A grill in accordance with claim 9, characterized in that the base of said lower shell is concave in the central portion thereof and that the deodorizing filter is mounted externally of said shell within the recess which is thus formed by said lower shell base.

12. A grill in accordance with claim 11, characterized in that the base of the lower shell has an opening which provides a communication with the filter, said opening being fitted with a protective cap.

13. A grill in accordance with claim 12, characterized in that the deodorizing filter comprises two superposed trays having perforated bases, the upper tray containing a product which absorbs fat-laden vapors and the lower tray containing an odor-absorbent product.

14. A grill in accordance with claim 9, characterized in that the filter is detachably mounted beneath the base of the lower shell by means of a bayonet-type fastening.

15. An electric grill for various foods such as meat, fish, bread and the like and comprising two shells mounted in interengaged relation and each containing an electric resistance heater element of the shielded type with spaced arms, one of said shells being fitted in the vicinity of its opening with an elastically deformable annular seal which has a free portion directed towards the surface of the other shell and which is adapted to come into contact with said other shell in the interengaged position, characterized in that there is mounted above the upper shell a shield which is secured thereto so as to form a free space between the top face of said shell and the shield.

16. A grill in accordance with claim 15 characterized in that the handles for carrying the upper shell are mounted on the shield.

17. An electric grill for various foods such as meat, fish, bread and the like and comprising two shells mounted in interengaged relation and each containing an electric resistance heater element of the shielded type with spaced arms, one of said shells being fitted in the vicinity of its opening with an elastically deformable annular seal which has a free portion directed towards the surface of the other shell and which is adapted to come into contact with said other shell in the inter-engaged position, wherein each shell is fitted with a resistance heater element having terminal arms extending to at least one plug-connector, said heater element being detachably mounted in a bore of the corresponding shell and containing the connector-pins which permit the engagement of a socket-connector which is also detachable, characterized in that the plug-connector comprises at least one retractable retaining member which in the rest position thereof serves to brake the free sliding motion of the plug-connector within the bore of the shell in which it is fitted, means being additionally provided for bringing the retaining member into the locked position of said plug-connector at the time of insertion of the socket-connector.

18. A grill in accordance with claim 17, characterized in that the retaining member is constituted by a key which is elastically mounted on the plug-connector and adapted in the rest position thereof to project outwards from said plug-connector to a partial extent, the projecting portion of said key being adapted to come into abutment against the edge of the bore of the shell at the time of insertion of the socket-connector.

19. An electric grill for various foods such as meat fish, bread and the like and comprising two shells mounted in interengaged relation and each containing an electric resistance heater element of the shielded type with spaced arms, one of said shells being fitted in the vicinity of its opening with an elastically deformable annular seal which has a free portion directed towards the surface of the other shell and which is adapted to come into contact with said other shell in the interengaged position, characterized in that the lower shell is carried on at least three feet formed of insulating material, each foot being fitted with a suction cup at the bearing point thereof.

20. An electric grill for various foods such as meat, fish, bread and the like and comprising two shells mounted in interengaged relation and each containing an electric resistance heater element of the shielded type with spaced arms, one of said shells being fitted in the vicinity of its opening with an elastically deformable annular seal which has a free portion directed towards the surface of the other shell and which is adapted to come into contact with said other shell in the interengaged position, characterized in that the lower shell has an inwardly-recessed base surrounded by a peripheral annular trough and that the juice outlet is provided with a manually operated movable closure member.

21. A grill in accordance with claim 20, characterized in that the member for closing the juice outlet comprises a tubular member forming a cock which is rotatably mounted on a cup carried by the annular trough.

References Cited

UNITED STATES PATENTS

| | | | |
|---|---|---|---|
| 1,894,875 | 1/1933 | Knapp | 219—402 |
| 2,025,899 | 12/1935 | Rhodes | 219—525 |
| 3,154,004 | 10/1964 | Huck | 219—347 XR |
| 3,350,542 | 10/1967 | Getman | 219—412 |

FOREIGN PATENTS 641,314 6/1962 Italy.

BILLY J. WILHITE, Primary Examiner

U.S. Cl. X.R.

99—391, 393, 400, 446; 219—402; 339—91; 220—46